United States Patent [19]
Aebli et al.

[11] Patent Number: 5,878,276
[45] Date of Patent: Mar. 2, 1999

[54] HANDHELD COMPUTER WHICH ESTABLISHES AN INPUT DEVICE AS MASTER OVER THE CPU WHEN IT IS COUPLED TO THE SYSTEM

[75] Inventors: Thomas John Aebli, Apex; Brent Alan Miller, Cary; William Walter Vetter, Raleigh, all of N.C.

[73] Assignee: International Business Machines Corporation, Armonk, N.Y.

[21] Appl. No.: 781,004

[22] Filed: Jan. 9, 1997

[51] Int. Cl.⁶ .................................................... G06F 13/12
[52] U.S. Cl. ......................... 395/839; 395/282; 395/283; 395/836; 395/837; 395/839; 395/883; 395/884; 395/885; 395/887
[58] Field of Search ...................................... 395/282, 283, 395/836, 837, 839, 883, 884, 885, 887

[56] References Cited

U.S. PATENT DOCUMENTS

| | | | |
|---|---|---|---|
| 4,079,452 | 3/1978 | Larson et al. | 364/200 |
| 4,589,063 | 5/1986 | Shah et al. | 364/200 |
| 4,964,075 | 10/1990 | Shaver et al. | 364/900 |
| 5,287,526 | 2/1994 | Wolf et al. | 395/800 |
| 5,457,784 | 10/1995 | Wells et al. | 395/829 |
| 5,515,514 | 5/1996 | Dhuey et al. | 395/282 |
| 5,548,782 | 8/1996 | Michael et al. | 395/835 |
| 5,623,261 | 4/1997 | Rose | 341/26 |
| 5,666,530 | 9/1997 | Clark et al. | 395/617 |
| 5,671,374 | 9/1997 | Postman et al. | 395/309 |
| 5,745,716 | 4/1998 | Tchao et al. | 395/350 |

FOREIGN PATENT DOCUMENTS 2291722 1/1996 United Kingdom ............ G06F 3/023

*Primary Examiner*—Thomas C. Lee
*Assistant Examiner*—Douglas Rupert
*Attorney, Agent, or Firm*—Bernard D. Bogdon; Daniel E. McConnell

[57] ABSTRACT

A computer system, and particularly a handheld mobile client system, in which a user input device such as a keyboard or a scanner, coupled by a tethering conductor or a wireless link such as an infrared radiation link, functions as a master while the central processing unit of the system functions as a slave in receiving input digital signals.

20 Claims, 11 Drawing Sheets

FIG. 10

Candida Form

Main | Back | ? |

Candida Bloodstream Infections Multicenter Study

Center: 12
Date of birth: 04-29-54
Date of admission: 04-29-54
Primary ICD9:

Hospital number: 123456789
Male ○  Female ○
Date admission ICU: 04-29-54
Secondary ICd9:

Record 1 of 6

Date of surgery:
Minutes:
ASA score:

Type: Access Procedure
Anesthesia:
Class: Clean-contaminated
Urgency:

90
91

HANDHELD COMPUTER WHICH ESTABLISHES AN INPUT DEVICE AS MASTER OVER THE CPU WHEN IT IS COUPLED TO THE SYSTEM

RELATED APPLICATIONS

This application is one of a series of related applications assigned to common ownership. Other applications in the series include:

application Ser. No. 08/703,171 still pending filed 22 Aug. 1996, entitled "Mobile Client Computer Programmed to Predict Input" with named inventors R. L. Bertram, D. F. Champion and P. Brittenham;

application Ser. No. 08/708,168 now U.S. Pat. No. 5,805,159 filed 22 Aug. 1996, entitled "Mobile Client Computer Programmed to Exchange Lists of Predicted Input" with named inventors R. L. Bertram and W. T. Oldfield;

application Ser. No. 08/814,034 still pending filed 10 Mar. 1997 entitled "Mobile Client Computer Interacting with Docking Device" with named inventors E. H. Booth, B. A. Carpenter, R. B. Ferrier, R. A. Resnick and W. W. Vetter;

application Ser. No. 08/706,990 now U.S. Pat. No. 5,805,158 filed 22 Aug. 1996, entitled "Mobile Client Computer Programmed to Copy Lists of Predicted Input" with named inventors R. L. Bertram, P. J. Brittenham and D. F. Champion;

application Ser. No. 08/963,475 still pending filed 3 Nov. 1997, entitled "Mobile Client Computer with Battery Charging Control" with named inventors C. Burroughs, B. A. Carpenter, G. O'Neil and R. A. Resnick;

application Ser. No. 08/813,148 still pending filed 7 Mar. 1997, entitled "Mobile Client Computer Programmed for Systems Message Display" with named inventors R. L. Bertram and D. F. Champion;

application Ser. No. 08/960,917 filed 30 Oct. 1997 still pending, entitled "Mobile Client Computer Programmed with Broswer Function" with named inventors R. L. Bertram and D. F. Champion;

application Ser. No. 08/813,522 now U.S. Pat. No. 5,812,131 filed 7 Mar. 1997, entitled "Mobile Client Computer Programmed to Process Table Displays" with named inventor R. L. Bertram;

application Ser. No. 08/807,969 still pending filed 3 Mar. 1997, entitled "Mobile Client Computer Programmed to Combine Cursor, Control and Input Functions" with named inventors P. J. Brtiienham and L. D. Comerford;

application Ser. No. 08/813,527 still pending filed 7 Mar. 1997, entitled "Mobile Client Computer Programmed to Display Drop Down Scrolling Indicator" with named inventors R. L. Bertram and D. F. Champion;

application Ser. No. 08/813,521 now U.S. Pat. No. 5,790,118 filed 7 Mar. 1997, entitled "Mobile Client Computer Programmed to Hide Empty Table Elements" with named inventor R. L. Bertram;

application Ser. No. 08/959,997 still pending filed 29 Oct. 1997, entitled "Mobile Client Computer with Integrated Cellular Telephone" with named inventors B. A. Carpenter, P. Lee, M. Noll and R. Reiland;

application Ser. No. * filed *, entitled "Mobile Client Computer with Holster for Integrating a Radio Transceiver" with named inventors D. H. Boehm, B. A. Carpenter, D. J. Hunt and M. S. Miller;

application Ser. No. 08/700,608 now U.S. Pat. No. 5,805,157 filed 12 Aug. 1996, entitled "Mobile Client Computer Programmed to Display Hexagonal Keyboard" with named inventors R. L. Bertram, D. F. Champion and L. S. Eichorn;

application Ser. No. 08/700,606 now U.S. Pat. No. 5,801,941 filed 12 Aug. 1996, entitled "Mobile Client Computer Programmed to Establish Soft Keyboard Targeting" with named inventor R. L. Bertram; and application Ser. No. 08/706,991 now U.S. Pat. No. 5,784,066 filed 22 Aug. 1996, entitled "Mobile Client Computer Programmed to Display Lists and Hexagonal Keyboard" with named inventors R. L. Bertram and D. F. Champion.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are the personal computer systems offered by IBM and identified as the PERSONAL COMPUTER AT, PERSONAL SYSTEM/2, PS/1, Aptiva, and the like. Persons of skill in the computer arts will be familiar with these systems.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models originally used the popular INTEL 8088 or 8086 microprocessor as the system processor. These processors have the ability to address one megabyte of memory. The Family II models typically used the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors. As the state of the art has progressed, Family I systems have developed toward ever higher capability central processor units, including the Intel PENTIUM brand microprocessor and its competitors, Reduced Instruction Set Computing (RISC) microprocessors such as the IBM and Motorola Power PC processors, and higher capability bus designs such as VESA and PCI bus designs. Again, persons of skill in the computer arts will be familiar with these systems.

The impact of such development on the manner in which computing is done in business and consumer environments has been profound. Prior to the development of personal computer systems, most use of computers was for business purposes only and data processing was done in the "glass house" which housed the computer system. Inquires were channeled through information managers for handling by computer technicians. With the wide spread use of personal computer systems access to data once maintained on an enterprise wide computer system became important to managers and ultimately line employees. Networks of personal computer systems grew up, with layered access through network servers to the enterprise systems or mainframes on which enterprise data is stored.

As information work has spread to an increasing number of information workers and impacted the work of more wide spread groups of employees within an enterprise, need for mobility of such employees has arisen. Particularly in such "outside" jobs as route salesperson, transport driver, or business consultant, it has become important to have access, while remote from an enterprise site, to enterprise data normally maintained on an enterprise system and accessed through a network of computer systems. Such access has been achieved, in part, through the use of wireline connected personal computer systems such as notebook or laptop computer systems. Typically, such a system may be equipped with a modem and communications software such that, when connected to a public switched telephone network (PSTN), the system may be connected with a supporting server or mainframe and a user may gain access to desired data.

With the development of radio communications such as exemplified by the cellular telephone networks, the possibility arose of eliminating the wireline connection between a personal computer system and a supporting server. Such systems have been developed, particularly for systems used in retail and warehousing businesses, which permit a user to move freely within an area which has radio transceiver service while remaining in intermittent or continuous contact with a data channel through which data may be exchanged with a server or mainframe supporting an enterprise activity. For purposes of discussion here, such systems in the hands of user will be referred to as "mobile client systems". A mobile client system is distinguished by the mobility of the user, who is free of the restraints against movement imposed by a wireline connection, and by the client nature of the system in that enterprise data accessed by the mobile client system is maintained on a server or mainframe computer system with which the mobile client is in communication. Such mobile client systems are also sometimes referred to as personal communications assistants or personal digital assistants. The interested reader is referred to "Wireless: The Revolution in Personal Telecommunications" by Ira Brodsky (Artech House, Boston, 1995) for additional background and information about mobile client systems.

As will be understood, the environments of use of mobile client systems typically require that such systems be powered by batteries. Long service life per battery charge is dependent upon demands made on the batteries for power. Thus designing for reduced power demand is significant in the development of such systems.

SUMMARY OF THE INVENTION

With the foregoing as background, the present invention contemplates a mobile client system in which provision is made for decreased power demand in connection with the use of a user data entry device such as a keyboard. Further, the present invention contemplates that flexibility in the adoption and use of a range of input devices and keyboards be accomplished.

In realizing this purpose of the present invention, a very simple interface is accomplished which supports low power consumption and the ability to dynamically connect or disconnect a user input device such as a keyboard from the mobile client system while allowing the input device to be self-identifying to the system and adopt any subset or superset of the functions and keys provided on an conventional personal computer keyboard. The interface, as to both hardware and software, is sufficiently generic that peripherals with differing functions, such as bar code scanners, magnetic stripe readers, and an automotive connection, can be accommodated.

BRIEF DESCRIPTION OF THE DRAWINGS

Some of the purposes of the invention having been stated, others will appear as the following description proceeds, when taken in connection with the accompanying drawings, in which:

FIG. 10 is an illustration of the display screen of the mobile client of FIG. 2 while driven by the execution of an application program on the mobile client to display certain data.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
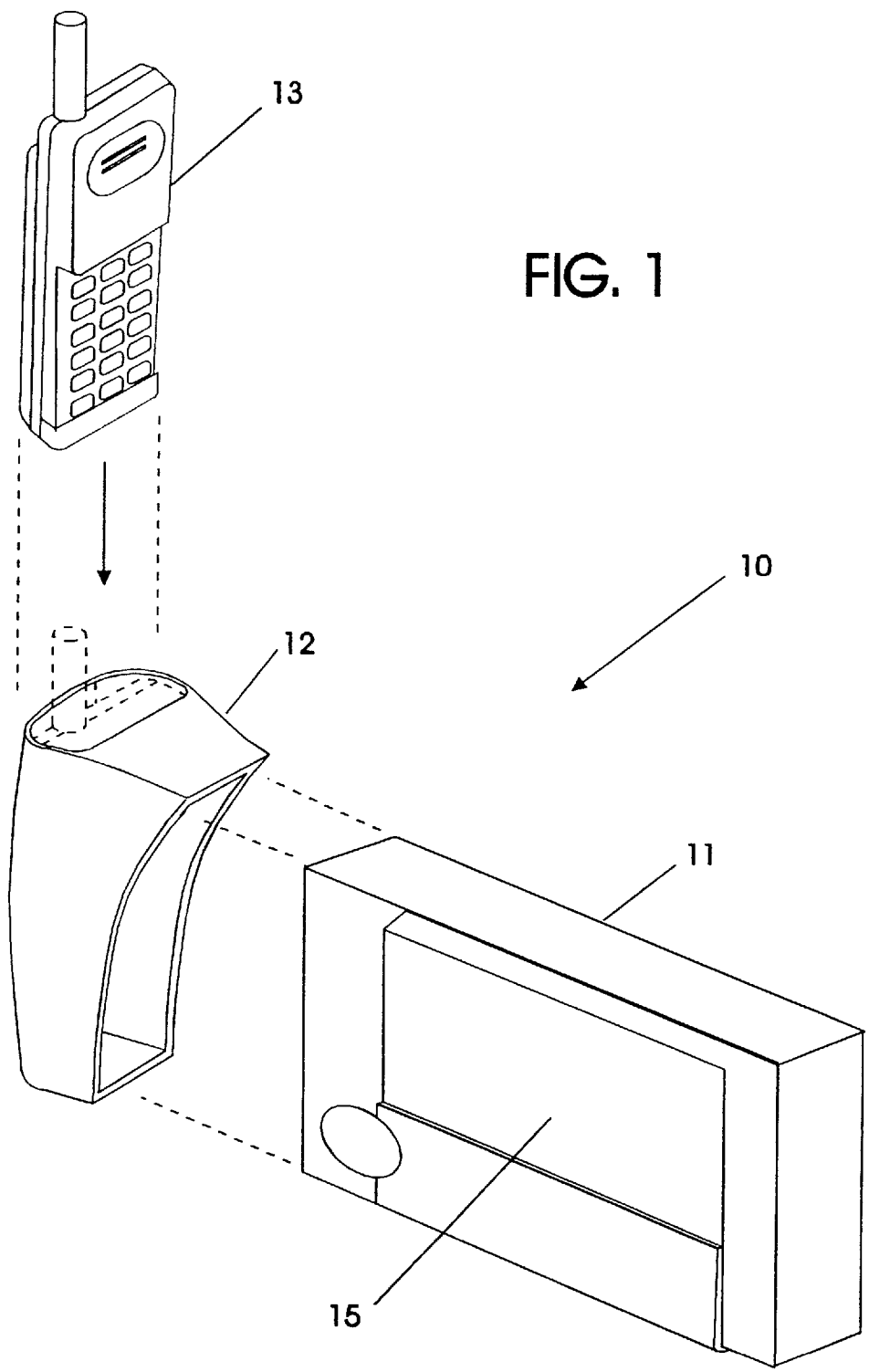
FIG. 1 is an exploded perspective view of certain elements of a mobile client computer system in accordance with this invention.
Figure 2:
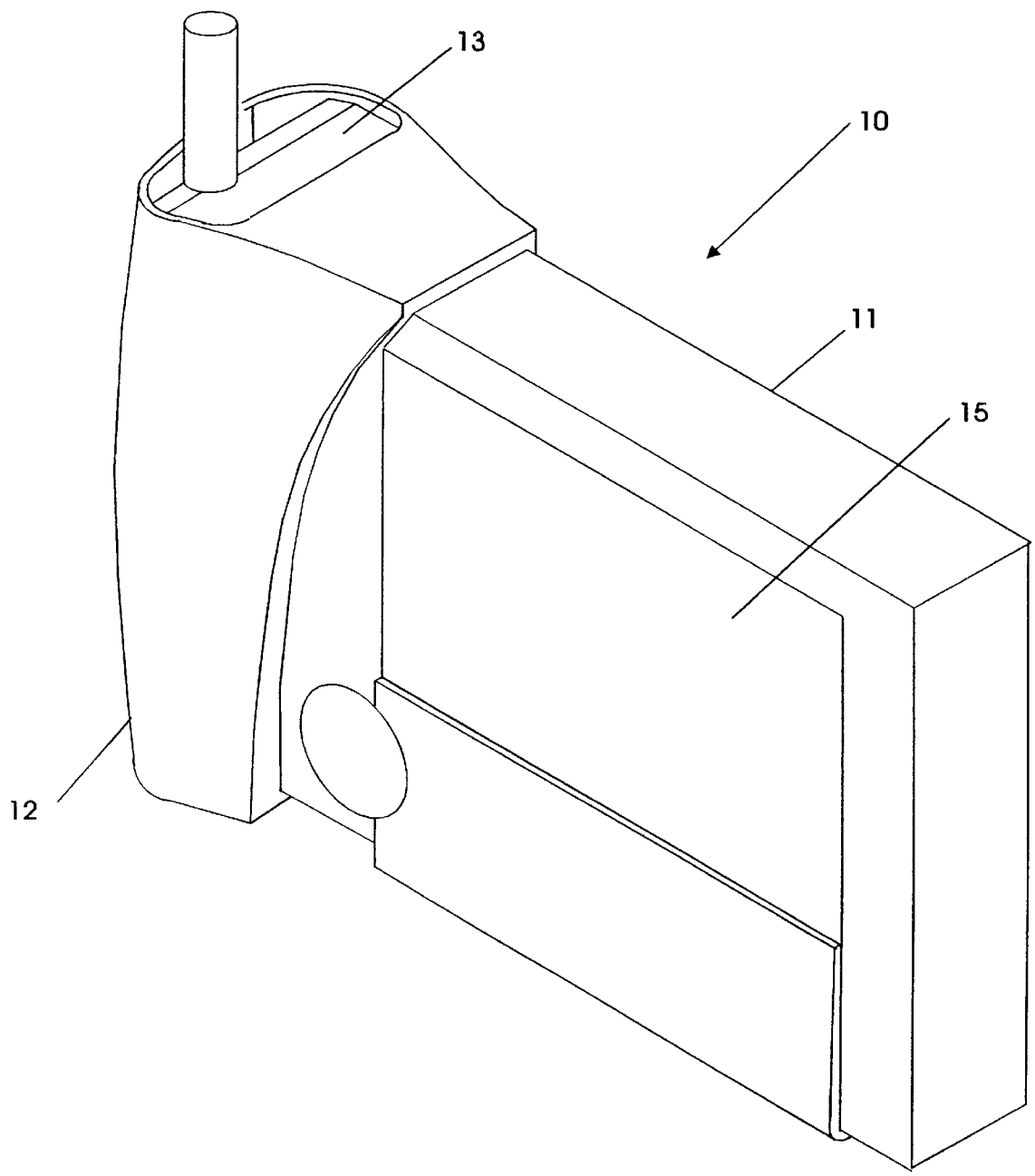
FIG. 2 is a perspective view of the mobile client system of FIG. 1 as assembled for use.
Figure 3:
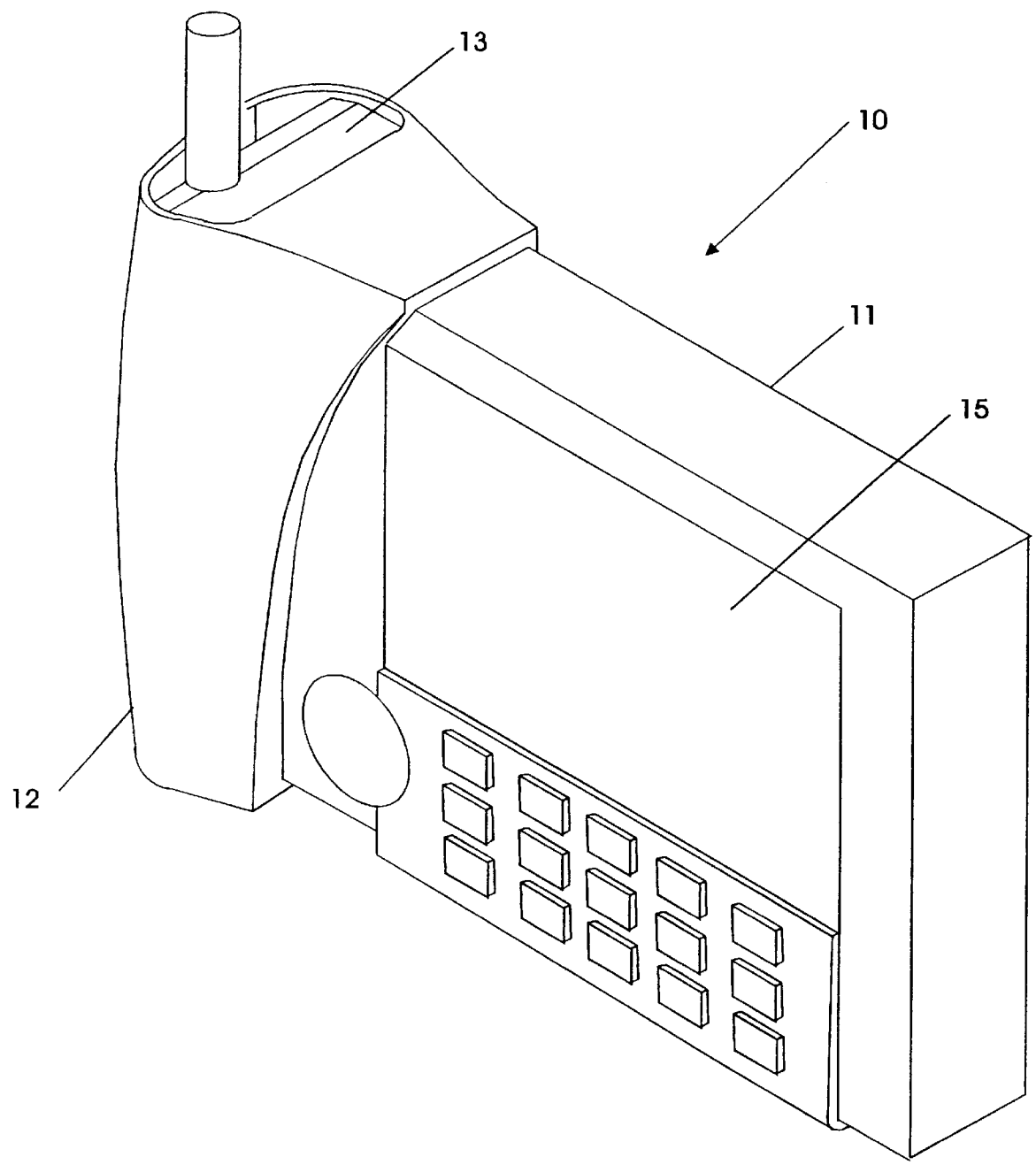
FIG. 3 is a view similar to FIG. 2 showing an alternate form of organization for the mobile client system of FIGS. 1 and 2.

Referring now more particularly to the accompanying Figures, FIGS. 1 through 3 illustrate an exemplary embodiment of a mobile client personal computer system (herein also called a "mobile client") in accordance with this invention and indicated generally at 10. As will become more clear from the description which follows, the mobile client may have a variety of characteristics while remaining within the contemplation of this invention. Central among those characteristics is that the system have provision for the capability of communicating at least data, possibly both data and audio such as voice, between the mobile client system and supporting servers and mainframes. In the illustrated embodiment, such capability is provided by providing a system which is separable into three distinct components, namely a system tablet 11, a holster 12 and a radio transceiver 13. In the form illustrated, the transceiver 13 is a cellular telephone which may be mounted within the holster 12, while the holster 12 may be connected with the system tablet 11 by slipping the tablet into a receptacle provided in the holster 12. The system tablet may optionally have an integrated keypad. While thus illustrated and here described as a three component system, it will be understood that many of the advantages of this invention as described hereinafter can be realized where the mobile client system 10 is unified. That is, where the radio transceiver 13 is integrated with the system tablet 11 and the connection therebetween is accomplished within a single cover for the system, apart from any use of a holster 12. The transceiver/holster/tablet organization provides certain advantages in some circumstances. However, it is to be understood that the invention can be practiced apart from this particular organization.

The distinctions between the systems of FIGS. 2 and 3 lies in the direct inclusion, in the system of FIG. 3, of a keypad apart from a touchscreen implementation of entry fields. This illustrates the flexibility of providing for both types of user input.

An advantage realizable with the tripartite organization is the ready substitution of one radio transceiver for another in order to accommodate various wide area networks (WANs) or local area networks (LANs). More particularly and as examples of WAN technology, while digital data and analog audio can be exchanged over a cellular telephone radio interface, with data using cellular digital packet data (CDPD) protocols, there are other possibilities. Among them can be digital radio techniques such as frequency division multiple access (FDMA) and time division multiple access (TDMA); spread spectrum technologies such as direct sequence spread spectrum (DS-SS) and resultant code division multiple access (CDMA); frequency hopping spread spectrum (FH-SS); and the combination of one of more of these technologies into what are known as advanced mobile phone systems (AMPS) or advanced radio data information service (ARDIS) or RAM Mobile Data. As these technologies evolve and gain wider acceptance, the tripartite organization will facilitate adapting existing tablets 11 to emerging radio transceivers 13, and thereby protect the investment of users in systems. However, for certain environments such as adverse ambient conditions of temperature, humidity, or exposure to shock as by dropping, a unified system with transceiver and tablet and supporting circuitry in a single cover may be a preferred choice.

Figure 4:
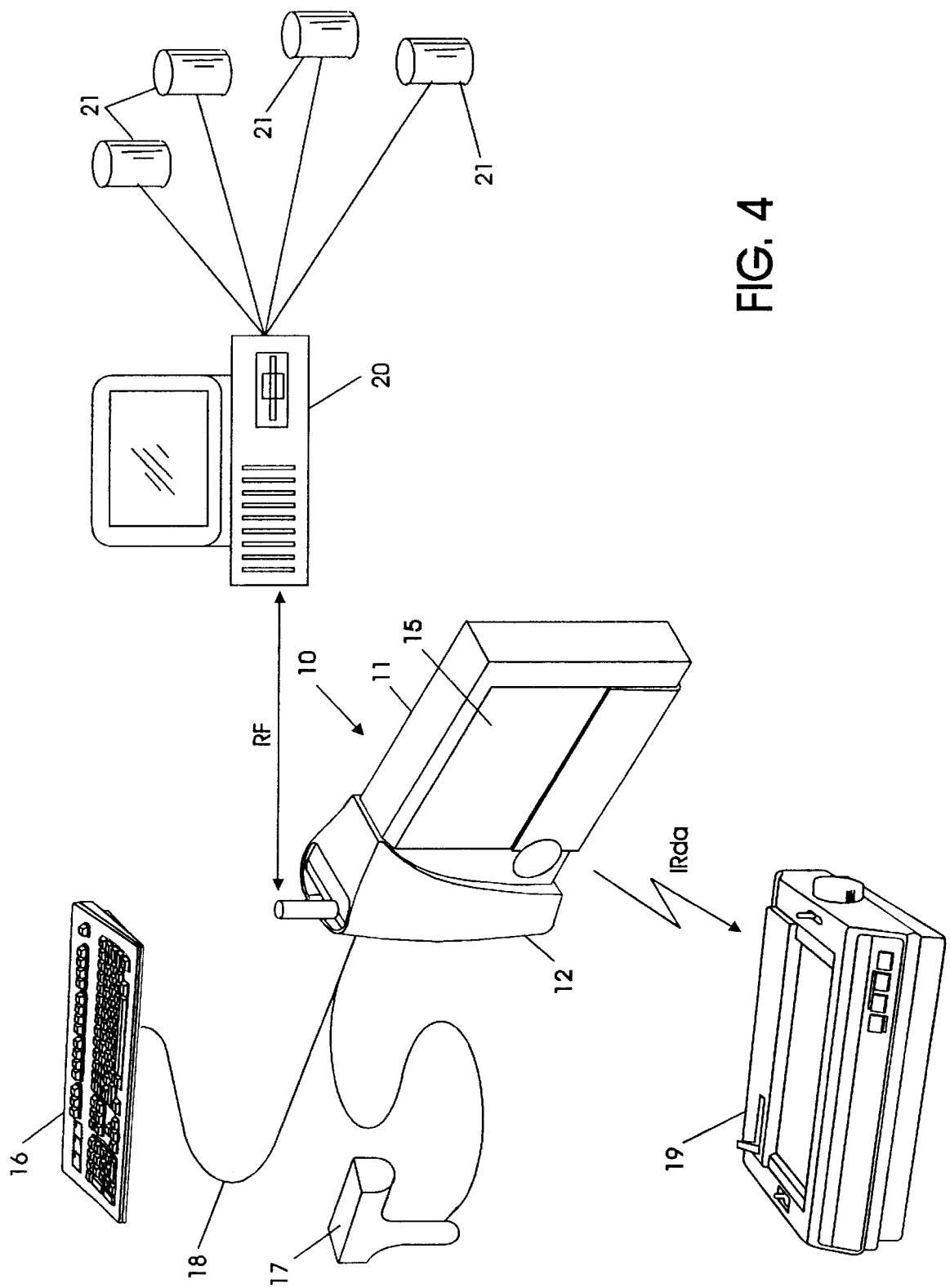
FIG. 4 is a diagrammatic representation of relationships among a mobile client system as shown in FIGS. 1 through 3 and supporting peripherals and systems.

Turning now to FIG. 4, what is there schematically indicated is the relationships among a system 10 in accordance with the invention and supporting servers and peripherals. More particularly, while the tablet 11 (as described more fully hereinafter) is normally adapted for input by a user through a touchscreen 15 embodied in a backlit liquid crystal display, the system 10 can accommodate other user input devices including a more conventional keyboard 16 and a bar code scanner 17. The user input device may be, as illustrated, wire tethered to the system 10 when desired for use, with the tethering conductors 18 providing signal pathways for data input to reach the system 10. As will be expanded upon hereinafter, the present subject invention is particularly concerned with an interface for such a user input device. Alternatively, a keyboard or other device such as the scanner may be linked for data transfer by other means known to persons of skill in the art, such as by direct integration as described above or an infrared link using a known protocol. By way of example and as illustrated in the drawing, the system is shown linked to a printer 19 by an IrDA link for data transfer by infrared radiation. While this is exemplary of an output device, similar technology is useful for linking an input device.

As indicated above, the radio transceiver provides a radio frequency link to a server indicated at 20, which may communicate by wireline with supporting mainframe data storage 21. Data relevant to the operation of the entire enterprise will be maintained on the supporting mainframe, and made available to the mobile client 10 in accordance with this and the above identified related inventions.

Figure 5:
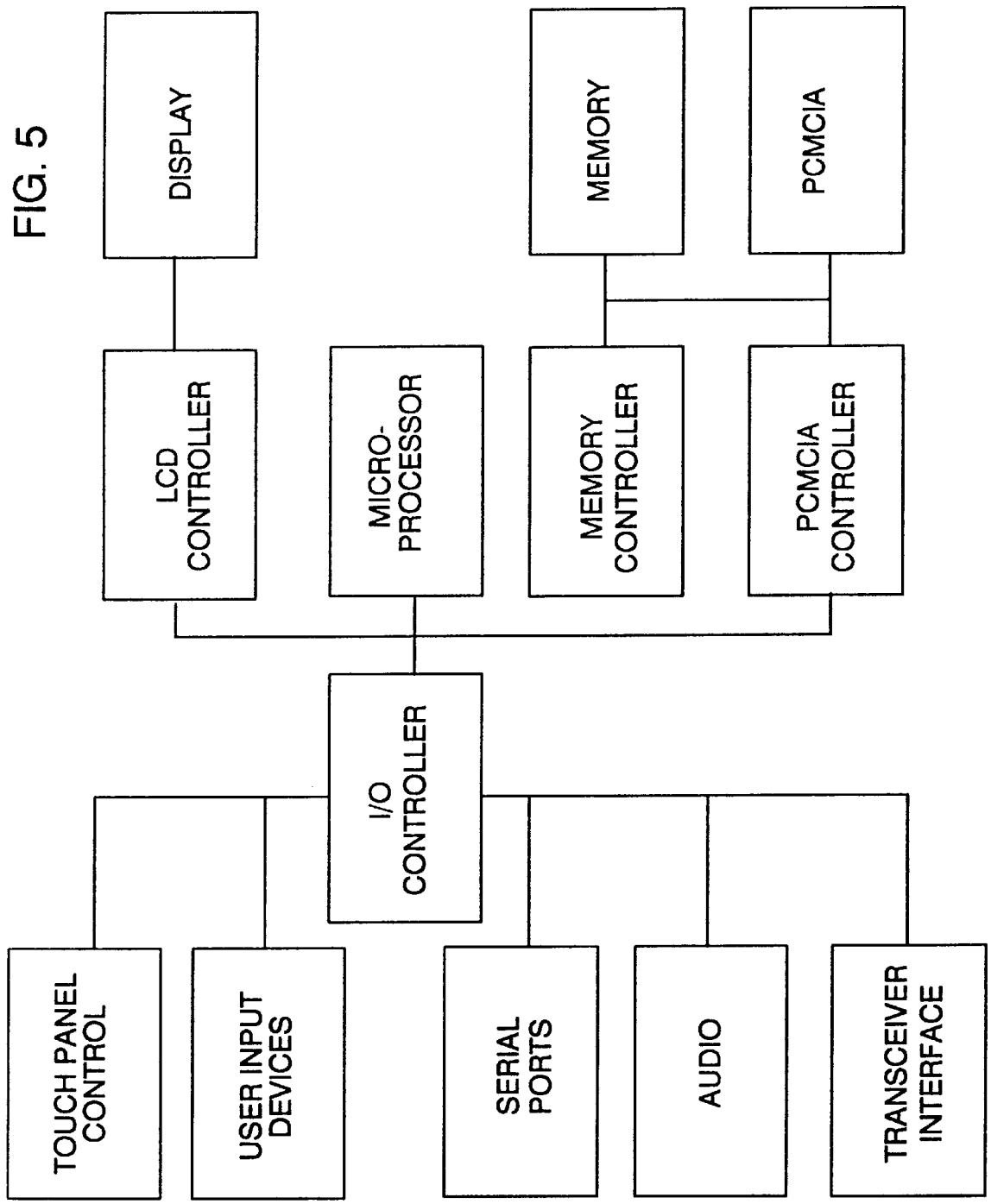
FIG. 5 is a schematic showing of certain circuitry elements embodied in the mobile client of FIGS. 2 and 3.
Figure 6:
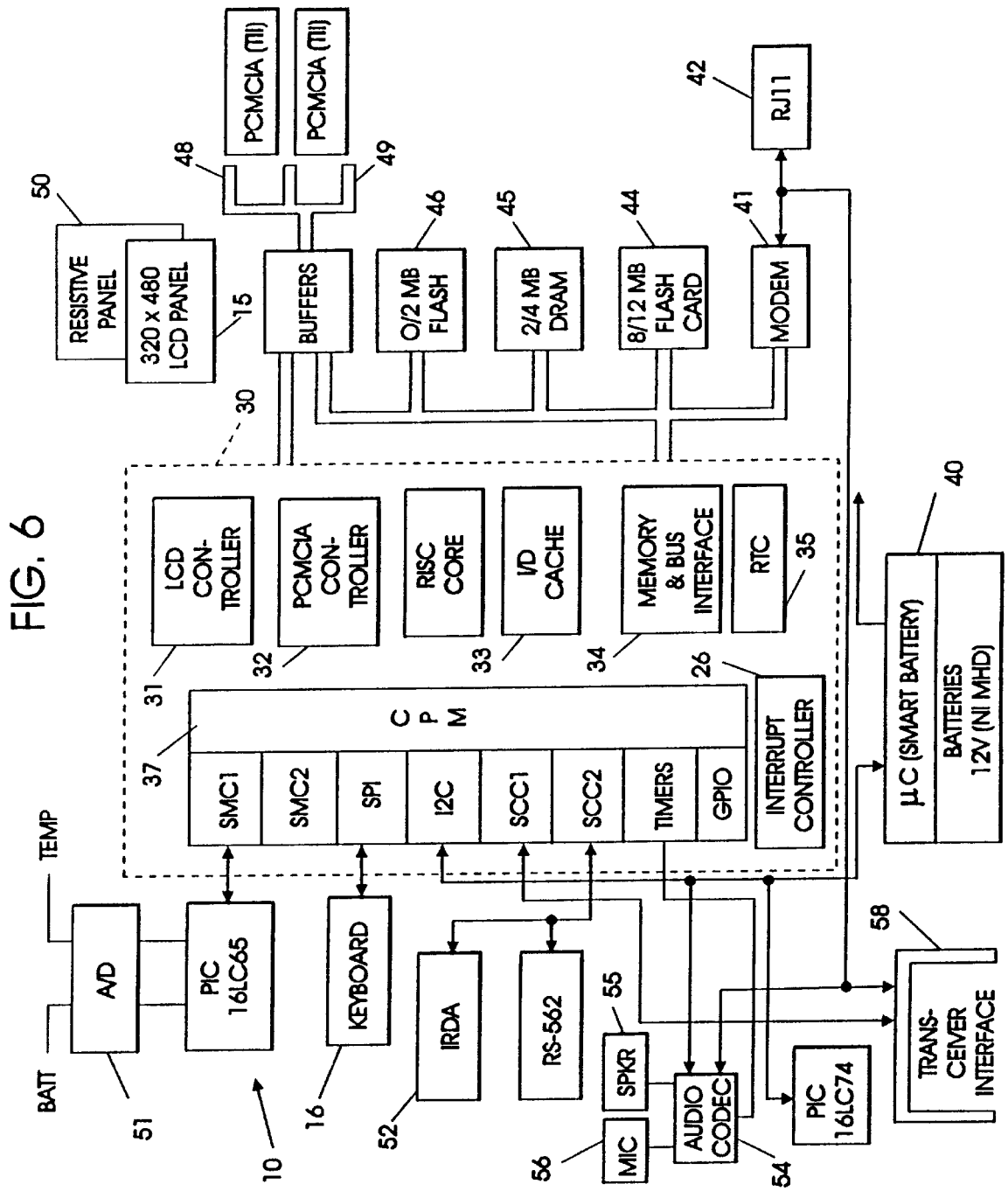
FIG. 6 is a view similar to FIG. 5 showing alternate circuitry elements.

Turning now to the circuitry elements which together accomplish the processing of data in accordance with this invention, FIGS. 5 and 6 illustrate forms of organization of such elements.

As shown in FIG. 5, which is somewhat simplified for purposes of illustration, the circuitry elements will include a central processing unit (CPU) and an associated input/output controller (IOC). The input/output controller is a programmable microcontroller which may be partitioned as a portion of the central processing unit, as is known to persons skilled in the design and fabrication of microprocessors. In the accompanying drawings, the IOC is sometimes identified as a peripheral microcontroller or by the acronym CPM. Certain of the elements provided, such as a memory controller, memory, a PCMCIA controller and associated card (if present) will be operatively coupled to the CPU and accessible to both the CPU and IOC. Others of the provided elements, such as the touchpanel control, user input devices, serial and audio ports and the transceiver interface, will be operatively coupled to the IOC and gain access to the CPU through the IOC.

As shown in FIG. 6, the illustrated mobile client system 10 has at its core a central processing unit (CPU) in the form of a microprocessor (indicated at 30) which uses reduced instruction set computing (RISC) characteristics, The CPU or processor has elements which include a controller 31 for a liquid crystal display; a controller 32 for peripherals of the type known as PCCards or PCMCIA cards; instruction/data cache 33; an interface to memory and an external bus 34; and a real time clock 35. The microprocessor also has an interrupt controller 36 and an input/output controller core 37 which defines interfaces for a variety of services. While here disclosed as a single processor chip having these characteristics, it is known from the manufacture and use of prior art computer systems that such computational capability and interface availability can be reached by other means, such as the use of an Intel X86 based processor surrounded by appropriate support logic or chips. Thus while the embodiment of FIG. 6 is offered as exemplary of a system in accordance with this invention, it is known that the core functionality of such a mobile client system can be otherwise configured. Similarly, while here described with reference to a handheld mobile client system, the functionality here described is attainable in other more conventional systems such as a desktop or notebook system.

As indicated in FIG. 6, the core microprocessor 30 is supported by peripherals. Most importantly, power for operating of the system is supplied from a battery 40. Preferably, the battery 40 is of the type known as a "smart" battery, in which provision is made for self monitoring by the battery of charge state and recharge progress. Such batteries are known and will provide signals to the mobile client system processor 30 which can be used to generate indications to a user of the battery charge state, readiness for re-use after charging, etc. The mobile client also preferably has a conventional modem 41, for use when connected by wireline, and a telephone interconnection point 42 (indicated as an RJ-11 connector). Memory for the system is provided by a flash memory accessory card 44; by dynamic random access memory (DRAM) 45; and by core flash memory 46. Preferably, a pair of PCMCIA slots, of type 11, are provided as shown at 48 and 49 for the addition of other functionality.

In order to display the result of data handling operations performed by the mobile client system, the system 10 has an LCD 15 as mentioned above. The LCD is overlain by a suitable touchscreen 50 which functions as a digitizer to recognize when input is made by a user. There will be further discussion of this functionality later in this description. Input from the touchscreen, as from the battery and a temperature sensor, passes through an analog/digital converter 51 to an input/output (I/O) port of the processor 30. Other I/O ports of the processor 30 provide for connection to a keyboard as described above; an IrDA port 52, an audio CODEC 54 and associated speaker 55 and microphone 56; and an interface connector 58 for the radio transceiver 13.

As was pointed out hereinabove, it is to be understood that the specific organization of functions here described with reference to FIGS. 5 and 6 may be varied due to a designers choice of functions to be supported, processor core, and support logic.

As mentioned above, the mobile client system 10 obtains power from a battery. While such operation is appropriate for mobility, provision is made for support of the system 10 by connection to more conventional power sources in the form of alternating current electrical mains. Such power sources are identified at 60 in FIG. 7, to which reference is had in the following description of power management relationships. As will be understood, the management of power usage by a mobile client system is significant with regard to usability of the system.

Figure 7:
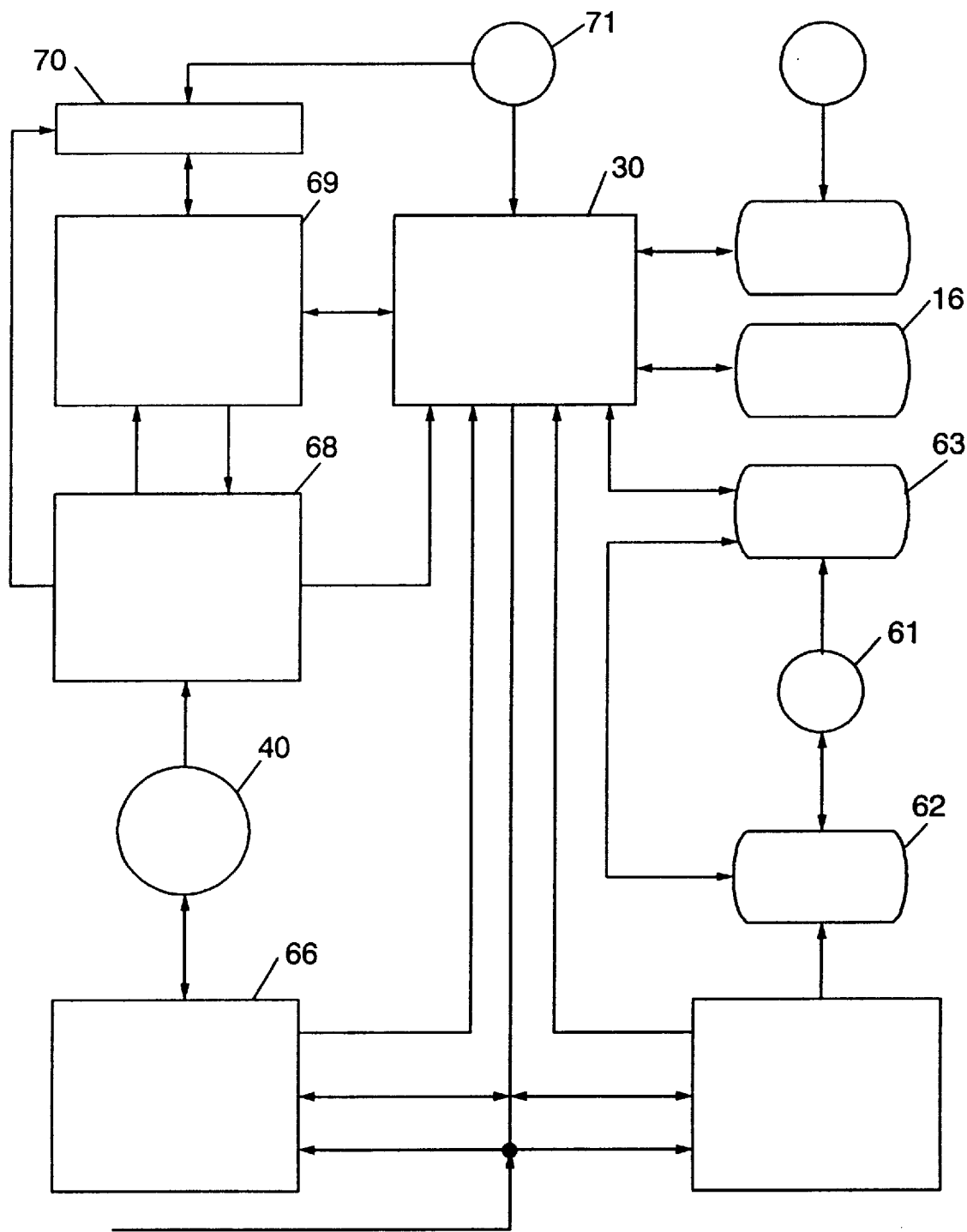
FIG. 7 is a schematic showing of certain circuitry elements and their relationships in the mobile client of FIGS. 2 and 3.

FIG. 7 illustrates the organization of peripherals around the processor 30 from the perspective of power sources and consumption. The power management topology is such that power flows to the processor 30 in the tablet 11 from the main battery 40, while separate flows of power and control impact the holster 12, any radio transceiver 13 mounted in the holster, and any PCCard accessories used by the system. This division of power flows is of significance to the mobile client system 10 here described. More particularly, a separate battery 61 is provided in the holster 12. The holster battery 61 preferably is a "smart" battery, and has associated therewith in the holster 12 a battery controller 62, a holster peripheral controller 63, and associated circuitry 64 effective to interface the data streams flowing to and from the processor 30 with the radio transceiver 13. Thus, while circuitry in the holster 12 and transceiver 13 is under the control of the processor 30 (as will be pointed out more fully hereinafter), the power source is at least somewhat independent of the tablet 11. This is a significant division. When the tablet is engaged with a holster, the circuitry in the two components cooperates in management of the whole. When a transceiver 13 (which, if a conventional cellular telephone, may have its own power source and power management techniques) is positioned in the holster 12, then the transceiver 13 may also have a coordinated role in participating in power management for the tripartite system.

Turning more particularly to the tablet 11, that system will have controller circuitry 66 for the battery 40 and a power supply 68 to which the battery 40 supplies power for operation of the tablet 11. In the present system, provision is made for a separate microcontroller 69 to exercise control over the power supply in order to off-load certain requirements from the core processor 30. The microcontroller receives input from the processor 30 and from a converter 70. The processor 30 and converter 70 are supported, for minimal functions, by a battery 71 for the real time clock 35. The RTC battery 71 assures that the tablet system will wake up when called as described more fully hereinafter.

Figure 8:
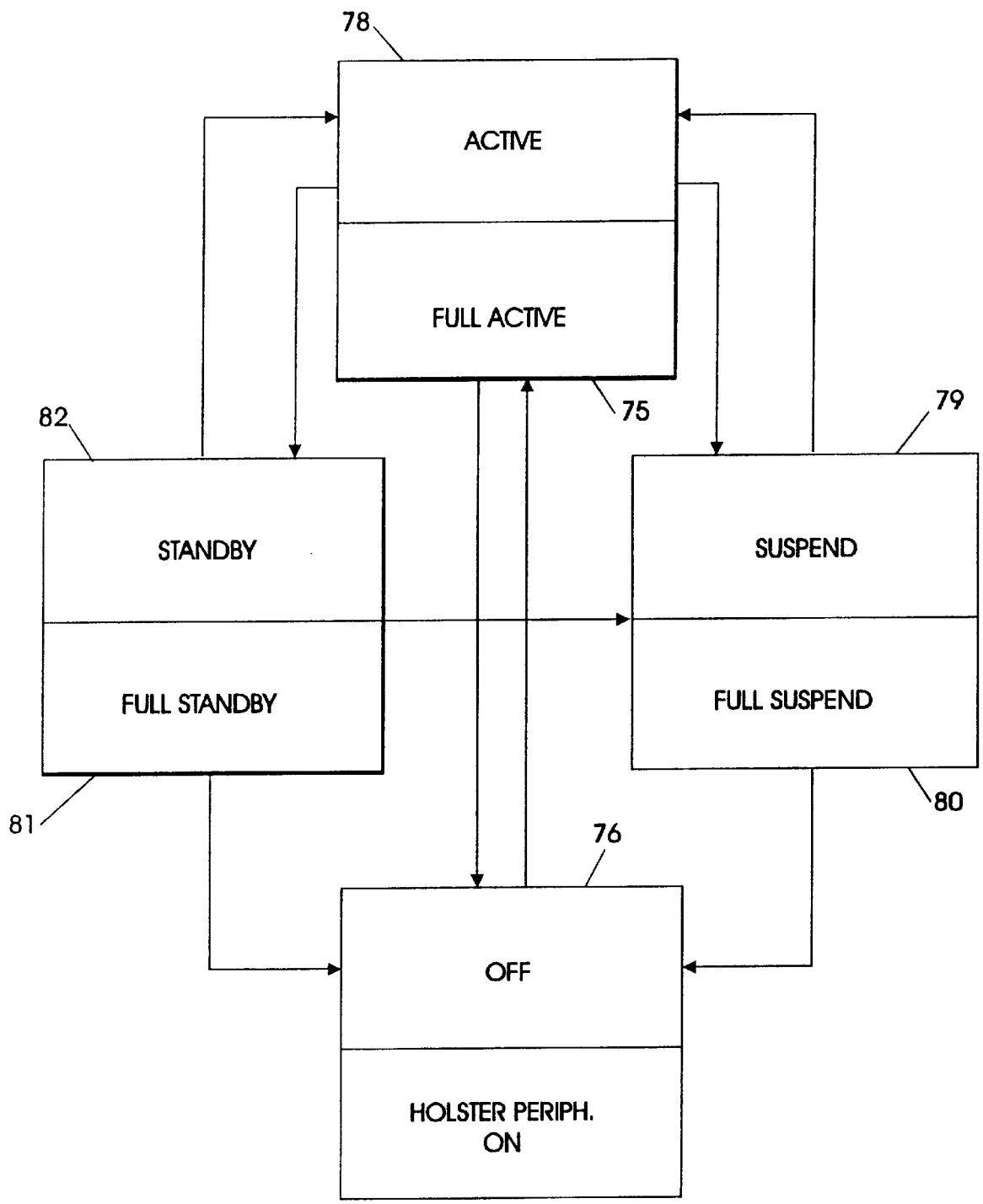
FIG. 8 is a state diagram of power modes for the mobile client of FIGS. 2 and 3 and transitions among them.

Turning now from the hardware topology to a discussion of the power modes and transition events for the mobile client system 10, FIG. 8 is one illustration of such modalities. For purposes of the following description, it should be noted that a user of the mobile client system will be provided with indicators for the levels of activity of the system. Typically, such indicators or annunciators will be in the form of light emitting diodes (LEDs), as such devices are readily available, inexpensive, and known to most users of technical devices. The tripartite system may be provided with an indicator for the tablet 11, and indicator for the holster 12, and an indicator for the transceiver 13. In FIG. 8, distinctions are drawn between states of activity which reflect differing levels of activity between the tablet 11 and holster 12, and an assumption is made that the system illustrated is a tripartite system with tablet and holster joined.

With this background in mind, the fully active state of the system will have both the tablet 11 and the holster 12 fully activated as indicated by illumination of the corresponding LEDs and the backlit LCD 15. That state is indicated at 75. The completely opposite state, with all components powered down (as if when all batteries have been removed), is indicated at 76, and would result in all LEDs and the backlit LCD being unilluminated. From the state of being fully active, a user may elect to turn off the holster 12, either by operating a switch provided for that purpose or by interrupting a necessary interconnection through separating the holster from the tablet or the radio transceiver from the holster. In such an event, the tablet LED and LCD may remain illuminated (as the tablet remains active) while the holster LED becomes unilluminated (indicated at 78). The mobile client may be capable of data processing using data stored in memory, yet be disconnected (intermittently or temporarily) from the supporting servers 20 and data storage 21. Upon an occurrence determined by software executing on the mobile client system, the system may enter a state known as suspend. In the suspend state, indicated at 79, the tablet LED and LCD and the holster LED are dark. Should it be appropriate for the radio transceiver to be used while the remainder of the tripartite system remains in suspend state, then the system can enter a state indicated at 80 in which the holster LED is illuminated and the transceiver functional. Similarly, upon an occurrence determined once again by software executing on the mobile client system, the system may enter a state known as standby, indicated at 81. In standby, the tablet LCD will be darkened to save power, while the tablet LED will remain illuminated to indicate that the system can be "awakened" readily. The holster may be either powered down (with LED dark, a state indicated at 82) or remain active. A timer function is provided which, after passage of a predetermined time interval with the system 10 in Standby, will transition the system to Suspend mode.

The system can transition between Off state 76 and Active states 78 or 75 by use of an on/off switch. The system can transition from any Suspend or Standby state to Off state 76 by use of the on/off switch or battery removal. The system can transition from Suspend states 79 or 80 to Active states 78 or 75 in response to a suspend/resume input from a user, an incoming call indication from the radio transceiver connected with the holster, time out of a timed interval, or a battery low charge indication from the smart battery controllers. The system can transition from Standby states to Active states 78 or 75 in response to user events such as an input by way of the user input device or touchscreen.

Figure 9:
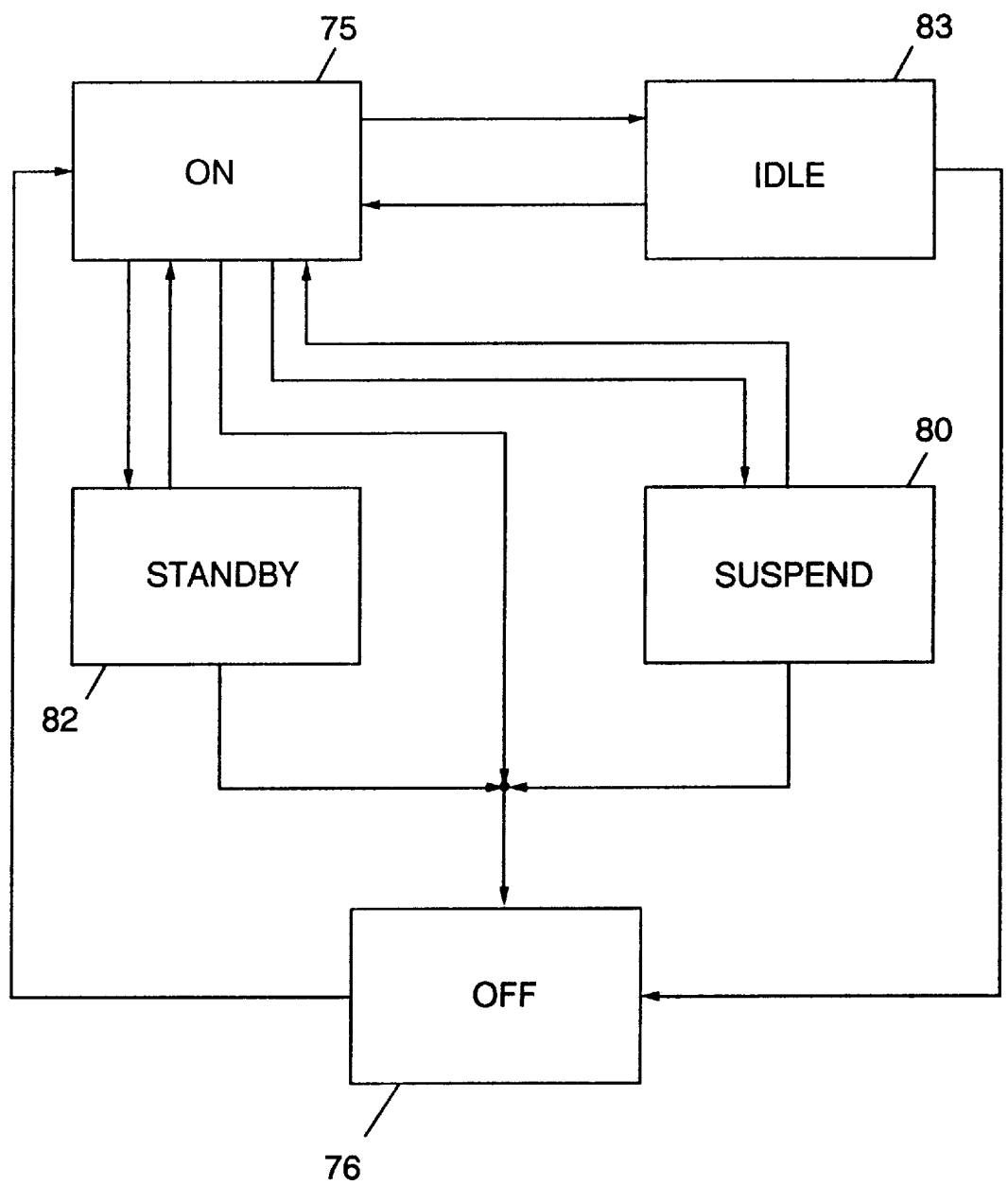
FIG. 9 is a diagram similar to that of FIG. 8 showing the states of certain elements of the mobile client of FIGS. 2 and 3 and including the status of software executing on the mobile client.

Another view of the power modes and transition events is given in FIG. 9. There, the system states are represented as being an On state 75; Idle state 83; Standby state 82; Suspend state 80; and Off state 76. In the On State 75, the system LEDs and LCD are illuminated, the processor 30 is operating in normal high function mode, the microprocessor of the user input device is operating in normal high function mode, application programs are active, and other peripherals are power managed as needed. Passage of time with inactivity will result in the system entering the Idle state 83, in which execution of application programs by the processor has ended, the processor enters a "doze high" mode of power management, the LCD is illuminated, the user input device enters its own Idle state, and other peripherals are power managed as needed. Any user event including keypresses on a keyboard will return the system to the On state. Should the passage of time cause the system to enter the Standby state 82, then application programs become static, the processor enters a "doze low" mode of power management, the LCD is dark, and all other peripherals are power managed as needed. Should the passage of time cause the system to enter the Suspend state 80, application programs become static and are checkpointed for resumption, the processor enters a "sleep" mode of power management, the LCD is darkened, and all other peripherals are off. Thus in terms of time intervals for turnaround to fully active state 75, the system will return most quickly from Idle state 83, less quickly from Standby state 82, less quickly from Suspend state 80, and most slowly from Off state 76.

It is now believed instructive to address briefly the display and communication of data as contemplated for the mobile client system of this invention. Referring now more particularly to FIG. 10, there is shown there an exemplary representation of a display screen for an application program executed on the system 10. Preferably, the system 10 executes an application program in the nature of a browser program as used for connection by HyperText Transfer Protocol (HTTP) and for files in HyperText Markup Language (HTML). HTTP and HTML have come into wide use in the environment known as the internet or world wide web. These technologies are here used to facilitate operation of the mobile client system with minimal resources in the client and maximum use of resources available through the supporting server and mainframe data storage.

More particularly, the processor 30 of the client system executes an operating system program and a browser program stored in the system flash memory 46. In executing these programs, the system exchanges data with a supporting server by passing data through the radio link provided by the transceiver 13 and interface 58 or the modem 41 if then wire connected. Data so exchanged may be stored for manipulation by the operating system and browser in the system DRAM memory 45. The browser, in conjunction with the data obtained from the supporting server, will display on the LCD 15 a screen which may, for example, appear as shown in FIG. 10. The screen there shown has a title bar 90 across the upper limit of the displayed field and, within the displayed field, a form having defined fields for data such as identifying numerals or names. In the specific form illustrated, the fields include a field for a center number, a hospital number, dates of birth and admission of the identified patient, and the like. Adjacent the title bar 90 is a representation of an animal, shown at 91 and here illustrated as a kangaroo. This representation is used, in accordance with certain implementations of this invention, to indicate that the system is "jumping" from one data access to another and that a user should await completion of the "jump". There are also provided, immediately below the title bar 90, indications of function "buttons" such as return to the main (or initial) screen, go back one screen, exchange data by wireless link, battery charge state, and navigation about the screen presented. Certain fields, such as the Date of Admission to the ICU and the Class fields, may be annotated by a user, and are so indicated by the positioning adjacent those fields of a "notebook" icon. The notebook may be either closed (as adjacent the Date of Admission field) suggesting that it presently lacks any annotation, or opened (as adjacent the Class field) suggesting that it presently contains an annotation.

Inasmuch as the mobile client system 10 has a touchscreen 50 which overlies the LCD 15, input of data into the system can be accomplished by a stylus, pointer or finger applied to fields of the touchscreen as well as by the optional user input device. Thus, referring to FIG. 10, should a user desire to input information identifying the gender of a particular patient, the user could touch (with stylus, pointer or finger) the buttons "male" or "female" to enter that data. Similarly, should a user wish to enter an annotation, the user could touch the field defined by the notebook icon to change the icon between the closed and open states and thereby open a field for entry of appropriate numerical or alphabetic data.

Other and further functions of the applications program and the screen display will become more clear from discussion which follows or appears in the above identified related applications.

In accordance with the present invention, the mobile client system is provided with an optional user input peripheral device that interfaces to the system microprocessor 30 while providing certain favorable characteristics. These characteristics include extremely low power consumption, on the order of 0.01 Watt as compared with the 0.7 Watt demand typical of a laptop or notebook computer system. This is accomplished by logic in the user input device and code executing on the input device microprocessor that allows the device microprocessor to enter a very low power consumption state during idle periods, including idle periods between keypresses or data inputs. A very simple electrical interface is provided which is implemented by an embedded microprocessor and which accommodates connecting to and disconnecting from the mobile client system while avoiding any need for reloading the system operating system software. The user input device is self identifying, thereby allowing multiple (or custom) keyboards or other input devices to be easily developed to support various languages and specific customer/industry requirements.

Figure 11:
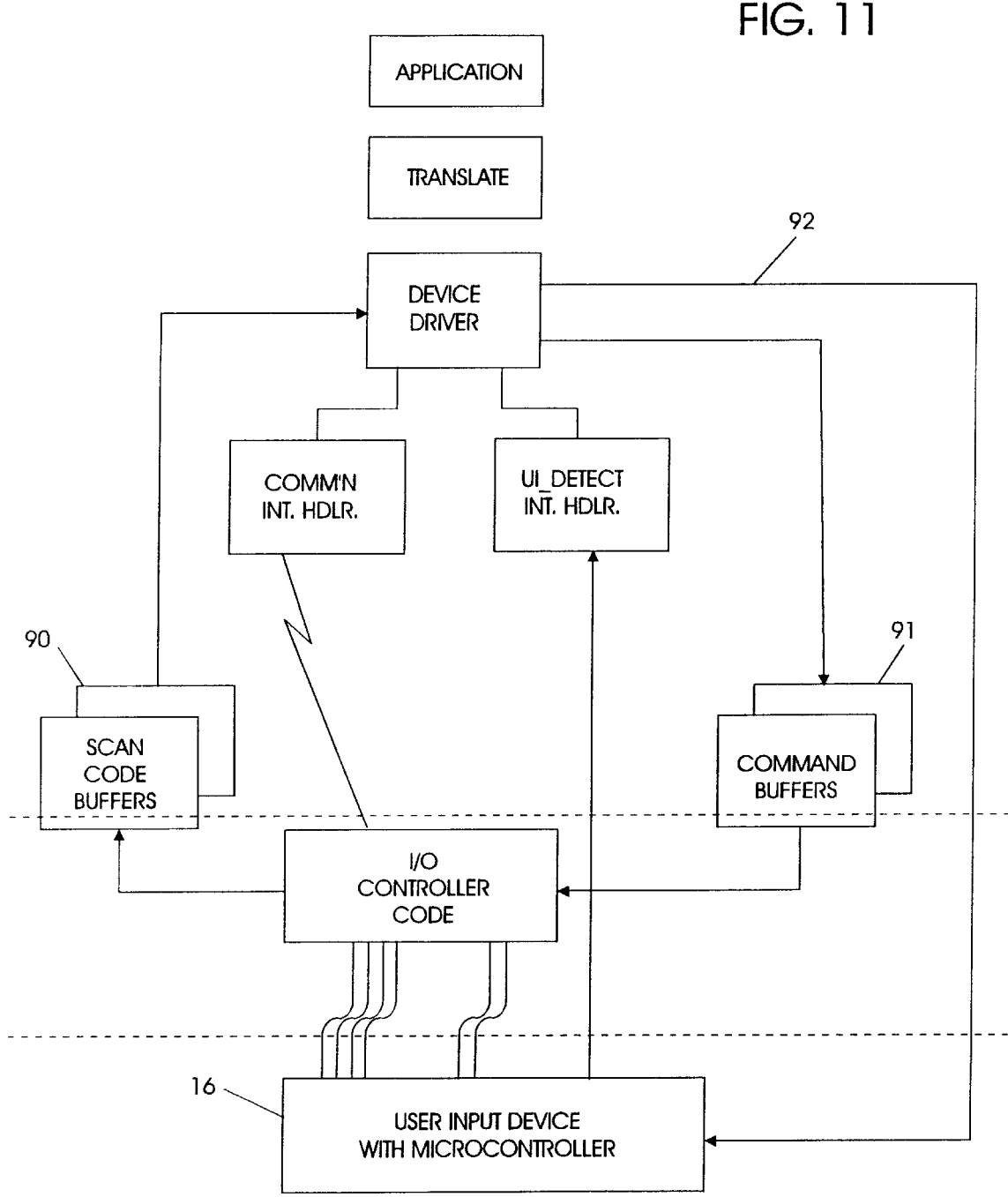
FIG. 11 is a schematic illustration of the software and hardware components of a keyboard and interface as contemplated by this invention.

As illustrated in FIG. 11 where software and some hardware elements of the CPU, IOC and input device are shown, the present invention provides a user input device 16 which incorporates keys defining a subset of the well known "IBM PC" keyboard. The present invention also allows for a user input device which incorporates keys which are a superset of the "IBM PC" keyboard. The IBM PC Keyboard is described in *PC Keyboard Design*, by Gary J. Konzak (Second edition, 1993; Annabooks, San Diego, Calif.) and the *IBM Personal System/2 Hardware Interface Technical Reference—AT Bus Systems* (First edition, 1991; IBM, Armonk, N.Y.), to which the interested reader is referred. The user input devices of this invention use an embedded microcontroller which executes certain software as herein described. Such a microcontroller, while executing the software, will support multiple types of devices and keyboards/keypads, including national language and special purpose industry-specific keyboards. Portable keyboards, including such defined keyboards, are contemplated as being a subset or superset of the full "IBM PC" style keyboard. The standard user input device software will support the full "IBM PC" key code repertoire, as many instances of an input device will be some subset of this. In the form illustrated, the input device is connected via a custom cable to the programmable microcontroller (IOC) core, identified in FIG. 6 as the CPM 37, portion of the system processor 30 through a serial port interface identified at SPI. A serial bus interface is used to connect the user input device and the system processor. Any serial interface providing at least clock and data signals may be used, including half-duplex serial interfaces such as the Serial Peripheral Interface (SPI), Inter-Integrated Circuit (I$^2$C), or other similar interfaces. The input device will scan itself and provide matrix position scan codes to the system processor.

In the form illustrated, the signal lines connecting the user input device microcontroller and the system processor include SPICLK, the SPI clock signal provided to the system processor from the user input device. This clock signal is used to shift data in and out of the system processor and the user input device, and is a gated clock which is active only when data is valid. The SPISEL signal is provided to the system processor from the user input device and must be active before the system processor will recognize SPICLK. The SPIMOSI or SPI Master Out Slave In signal, since the input device is the master, functions as the input device DATAOUT line. Similarly, SPIMISO or SPI Master In Slave Out functions as the DATAIN line. The UI_COMMAND signal is a general purpose input/output (GPIO) signal sent from the system processor to initiate communication from the system processor to the input device. The UI_Detect signal is an interrupt on the system processor indicative of input device insertion and removal.

In accordance with this invention and as indicated, the input device controller internal to the input device 16 functions as the "master" and the system processor 30 functions as the "slave." User input device scan code and command buffers (respectively indicated at 90 and 91) are interposed between the core of the system processor 30 and the IOC portion 37 of the processor, for use in exchanging data flows between code executing in the IOC and input device device driver code. The device driver is a data protocol, mapping matrix scan codes to IBM PC scan codes. This is only a translation operation, not a true communications protocol (i.e., framing, etc. is not required).

The input device initiates all activity on the serial interface port by controlling the clock, data, and chip select lines (i.e., when the input device sends data across the serial interface, as when a key is pressed). It is contemplated that the input device will allow a burst entry rate of 15 data bytes per second.

When the system processor 30 needs to initiate a command to the input device 16, it must activate the UI_COMMAND signal to the keyboard or other device through a pathway indicated at 92. The input device controller, sensing the input active, performs the necessary operations to activate the select, data and clock lines to read from the system processor. In the form illustrated, the input device controller initiates the SPI command through the SPI interrupt handler to the system processor to activate the select, data and clock lines. Examples of system processor-initiated communication include sensing the input device ID and various diagnostics commands.

A "keyboard simplifier" is provided in the input device microcontroller coding to collapse multiple make/break scan codes from a keyboard input device to a single key press event for the main processor. This includes handling multiple "key make" scan codes for typematic (repeat) keys and multiple key presses (e.g., Shift).

An illustration of the functions required of the program code for the input device will encompass several scenarios. For sending commands from the system processor to the input device, no special system support is required. The system processor will activate the UI_COMMAND signal to the input device and use the serial interface in transparent mode to send commands to and receive responses from the input device. For detecting the insertion/removal of an input device, no special support is required. The system processor will handle this interrupt and enable/disable the serial interface. Separate Data In and Data Out lines make software control on both the input device and the mobile client system much easier to implement. Matrix codes being sent add additional flexibility other than scan codes, such as allowing for non-standard special purpose keys to be supported.

Standard (PS/2) input device device driver software can be used in the mobile client system microprocessor.

In the drawings and specifications there has been set forth a preferred embodiment of the invention and, although specific terms are used, the description thus given uses terminology in a generic and descriptive sense only and not for purposes of limitation.

What is claimed is:

1. A mobile client computer comprising:

a housing sized to be held and manipulated by the hand of a user;

memory mounted within said housing and storing digital data;

a central processing unit mounted within said housing and coupled to said memory;

an input/output controller mounted within said housing and coupled to said central processing unit;

a serial port coupled to said input/output controller and defining a general purpose serial interface; and a display mounted in said housing and coupled to said central processing unit and said memory and displaying information derived from digital data processed by said central processing unit;

said serial port and said input/output controller and said central processing unit cooperating in (1) detecting the presence of a digital data generating user input device if connected to said serial port and (2) establishing a detected user input device as a master governing functioning of said central processing unit and (3) translating in said input/output controller digital data received through said serial port from a detected user input device.

2. A mobile client computer system according to claim 1 wherein said serial port, said input/output controller and said central processing unit cooperate in querying the identification of a detected user input device.

3. A mobile client computer system according to claim 1 wherein said serial port, said input/output controller and said central processing unit cooperate in translating matrix position codes generated by a detected user input device into scan codes.

4. A mobile client computer system according to claim 1 further comprising device driver code stored in said memory and executing on said central processing unit to derive input signals for said computer system, and further wherein said device driver code is responsive to scan code signals as determined by the design of a conventional personal computer keyboard.

5. A mobile client computer comprising:

a housing sized to be held and manipulated by the hand of a user;

memory mounted within said housing and storing digital data;

a central processing unit mounted within said housing and coupled to said memory;

a input/output controller mounted within said housing and coupled to said central processing unit;

a serial port coupled to said input/output controller and defining a general purpose serial interface;

a user input device coupled to said serial port and delivering therethrough digital signals identifying inputs to the computer system; and a display mounted in said housing and coupled to said central processing unit and said memory and displaying information derived from digital data processed by said central processing unit;

said user input device and said serial port and said input/output controller and said central processing unit cooperating in (1) detecting the identification of said user input device and (2) establishing said user input device as a master governing functioning of said central processing unit and (3) translating in said input/output controller digital data received through said serial port from said user input device.

6. A mobile client computer system according to claim 5 wherein said user input device, said serial port, said input/output controller and said central processing unit cooperate in translating matrix position codes generated by said user input device into scan codes.

7. A mobile client computer system according to claim 5 further comprising device driver code stored in said memory and executing on said central processing unit to derive input signals for said computer system, and further wherein said device driver code is responsive to scan code signals as determined by the design of a conventional personal computer keyboard.

8. A mobile client computer system according to claim 5 wherein said user input device is a keyboard.

9. A mobile client computer system according to claim 5 wherein said user input device is a scanner.

10. A mobile client computer system according to claim 5 wherein said computer system further comprises clock, data and select signal lines operatively interconnecting said input/output controller and said user input device and further wherein said user input device comprises a microcontroller, memory operatively coupled to said microcontroller, and a control program stored in said memory accessibly to said microcontroller and executing on said microcontroller for controlling said clock, data and select signal lines.

11. A computer system comprising:

a housing;

memory mounted within said housing and storing digital data;

a central processing unit mounted within said housing and coupled to said memory;

a input/output controller mounted within said housing and coupled to said central processing unit; and a serial port coupled to said input/output controller and defining a general purpose serial interface;

said serial port and said input/output controller and said central processing unit cooperating in (1) detecting the presence of a digital data generating user input device if connected to said serial port and (2) establishing a detected user input device as a master governing functioning of said central processing unit and (3) translating in said input/output controller digital data received through said serial port from a detected user input device.

12. A computer system according to claim 11 wherein said serial port, said input/output controller and said central processing unit cooperate in querying the identification of a detected user input device.

13. A computer system according to claim 11 wherein said serial port, said input/output controller and said central processing unit cooperate in translating matrix position codes generated by a detected user input device into scan codes.

14. A computer system according to claim 11 further comprising device driver code stored in said memory and executing on said central processing unit to derive input signals for said computer system, and further wherein said device driver code is responsive to scan code signals as determined by the design of a conventional personal computer keyboard.

15. A computer system comprising:

a housing;

memory mounted within said housing and storing digital data;

a central processing unit mounted within said housing and coupled to said memory;

a input/output controller mounted within said housing and coupled to said central processing unit;

a serial port coupled to said input/output controller and defining a general purpose serial interface; and a user input device coupled to said serial port and delivering therethrough digital signals identifying inputs to the computer system;

said user input device and said serial port and said input/output controller and said central processing unit cooperating in (1) detecting the identification of said user input device and (2) establishing said user input device as a master governing functioning of said central processing unit and (3) translating in said input/output controller digital data received through said serial port from said user input device.

16. A computer system according to claim 15 wherein said user input device, said serial port, said input/output controller and said central processing unit cooperate in translating matrix position codes generated by said user input device into scan codes.

17. A computer system according to claim 15 further comprising device driver code stored in said memory and executing on said central processing unit to derive input signals for said computer system, and further wherein said device driver code is responsive to scan code signals as determined by the design of a conventional personal computer keyboard.

18. A computer system according to claim 15 wherein said user input device is a keyboard.

19. A computer system according to claim 15 wherein said user input device is a scanner.

20. A computer system according to claim 15 wherein said computer system further comprises clock, data and select signal lines operatively interconnecting said input/output controller and said user input device and further wherein said user input device comprises a microcontroller, memory operatively coupled to said microcontroller, and a control program stored in said memory accessibly to said microcontroller and executing on said microcontroller for controlling said clock, data and select signal lines.

* * * * *